United States Patent
Tseng

(10) Patent No.: US 10,013,747 B2
(45) Date of Patent: Jul. 3, 2018

(54) IMAGE PROCESSING METHOD, IMAGE PROCESSING APPARATUS AND DISPLAY APPARATUS

(71) Applicant: BOE TECHNOLOGY GROUP CO., LTD., Beijing (CN)

(72) Inventor: Szuheng Tseng, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/555,943

(22) PCT Filed: Apr. 6, 2017

(86) PCT No.: PCT/CN2017/079547
§ 371 (c)(1),
(2) Date: Sep. 5, 2017

(87) PCT Pub. No.: WO2017/185957
PCT Pub. Date: Nov. 2, 2017

(65) Prior Publication Data
US 2018/0114301 A1    Apr. 26, 2018

(30) Foreign Application Priority Data

Apr. 29, 2016 (CN) .......................... 2016 1 0285505

(51) Int. Cl.
*G06T 5/00*  (2006.01)
*G06T 5/50*  (2006.01)

(52) U.S. Cl.
CPC ................ *G06T 5/009* (2013.01); *G06T 5/50* (2013.01); *G06T 2207/20208* (2013.01)

(58) Field of Classification Search
None
See application file for complete search history.

(56) References Cited

U.S. PATENT DOCUMENTS

2010/0259634 A1* 10/2010 Goh ..................... H04N 5/2351
                                                          348/222.1
2014/0267841 A1    9/2014 Sasaki

FOREIGN PATENT DOCUMENTS

CN          102014279 A        4/2011
CN          102819833 A       12/2012
(Continued)

OTHER PUBLICATIONS

International Search Report and Written Opinion in PCT/CN2017/079547 dated Jun. 27, 2017, with English translation.

*Primary Examiner* — Nicholas R Wilson
(74) *Attorney, Agent, or Firm* — Womble Bond Dickinson (US) LLP

(57) ABSTRACT

The embodiments of the present disclosure disclose an image processing method, an image processing apparatus and a display apparatus. Before frame image data is displayed, all of grey level values of the frame image data to be displayed are divided into a plurality of grey level areas. Then, a type of each of the grey level areas is determined to be a first grey level area or a second grey level area based on a result of a comparison between a first ratio and a second ratio corresponding to each of the grey level areas. Finally, the grey level values included in each grey level area are adjusted to increase a grey level span of the first grey level area and decrease a grey level span of the second grey level area, and the frame image data is displayed based on the adjusted grey level values. That is, this image processing method allows a range of the first grey level area in the to-be-displayed frame image data to be increased and a range of the second grey level area to be decreased.

19 Claims, 7 Drawing Sheets before displaying frame image data, determining grey level values of a plurality of pixels in the frame image data to be displayed and dividing all of the grey level values into a plurality of grey level areas based on a determined rule — S101 for each grey level area of the plurality of grey level areas, comparing a first ratio and a second ratio corresponding to the grey level area with each other, wherein if the first ratio is greater than the second ratio, the grey level area is a first grey level area, and wherein if the first ratio is less than the second ratio, the grey level area is a second grey level area, wherein the first ratio is a ratio of the number of pixels whose grey level values are within the grey level area to the number of all of the pixels and the second ratio is a ratio of a difference value between a maximum grey level value and a minimum grey level value in the grey level area to a maximum grey level value in the frame image data to be displayed — S102 adjusting grey level values included in each grey level area of the plurality of grey level areas to increase a grey level span of the first grey level area and decrease a grey level span of the second grey level area — S103

(56) References Cited

FOREIGN PATENT DOCUMENTS

| CN | 103034985 A | 4/2013 |
| CN | 105959584 A | 9/2016 |

* cited by examiner

```
┌─────────────────────────────────────────────────────────────────┐
│ before displaying frame image data, determining grey level values of a │──S101
│ plurality of pixels in the frame image data to be displayed and dividing │
│ all of the grey level values into a plurality of grey level areas based on a │
│                    determined rule                              │
└─────────────────────────────────────────────────────────────────┘
                                  │
                                  ▼
┌─────────────────────────────────────────────────────────────────┐
│ for each grey level area of the plurality of grey level areas, comparing a │
│  first ratio and a second ratio corresponding to the grey level area with │
│  each other, wherein if the first ratio is greater than the second ratio, the │
│  grey level area is a first grey level area, and wherein if the first ratio is │──S102
│  less than the second ratio, the grey level area is a second grey level area, │
│  wherein the first ratio is a ratio of the number of pixels whose grey level │
│   values are within the grey level area to the number of all of the pixels │
│  and the second ratio is a ratio of a difference value between a maximum │
│    grey level value and a minimum grey level value in the grey level area │
│    to a maximum grey level value in the frame image data to be displayed │
└─────────────────────────────────────────────────────────────────┘
                                  │
                                  ▼
┌─────────────────────────────────────────────────────────────────┐
│     adjusting grey level values included in each grey level area of the │──S103
│  plurality of grey level areas to increase a grey level span of the first grey │
│    level area and decrease a grey level span of the second grey level area │
└─────────────────────────────────────────────────────────────────┘
```

Fig.1 for each grey level area of the plurality of grey level areas, determining a target minimum grey level value and a target maximum grey level value corresponding to the grey level area based on the minimum grey level value in the grey level area, the maximum grey level value in the grey level area, the maximum grey level value in the frame image data to be displayed and the first ratio corresponding to the grey level area, wherein a difference value between the target maximum grey level value and the target minimum grey level value is equal to a rounded value of a product obtained by multiplying the first ratio corresponding to the grey level area by the maximum grey level value in the frame image data to be displayed, and wherein the target minimum grey level value corresponding to the first grey level area is less than or equal to the minimum grey level value in this first grey level area, the target maximum grey level value corresponding to the first grey level area is greater than or equal to the maximum grey level value in this first grey level area, the target minimum grey level value corresponding to the second grey level area is greater than or equal to the minimum grey level value in this second grey level area, and the target maximum grey level value corresponding to the second grey level area is less than or equal to the maximum grey level value in this second grey level area — S201 for each grey level area of the plurality of grey level areas, determining an adjustment coefficient corresponding to the grey level area based on a ratio of the difference value between the target maximum grey level value and the target minimum grey level value corresponding to the grey level area to the difference value between the maximum grey level value and the minimum grey level value in the grey level area — S202 for each grey level area of the plurality of grey level areas, calculating y-values corresponding to grey level values x included in this grey level area in accordance with a formula, and rounding the y-values to obtain the adjusted grey level values, wherein K denotes the adjustment coefficient corresponding to the grey level area, $Y_0$ denotes the target minimum grey level value corresponding to the grey level area and $X_0$ denotes the minimum grey level value in the grey level area — S203

IMAGE PROCESSING METHOD, IMAGE PROCESSING APPARATUS AND DISPLAY APPARATUS

RELATED APPLICATIONS

The present application is the U.S. national phase entry of PCT/CN2017/079547, with an international filing date of Apr. 6, 2017, which claims the benefit of Chinese Patent Application No. 201610285505.6 filed on Apr. 29, 2016, the entire disclosures of which are incorporated herein by reference.

TECHNICAL FIELD

The present disclosure relates to a technical field of display, particularly to an image processing method, an image processing apparatus and a display apparatus.

BACKGROUND

When taking pictures in the case of a large light ratio, a normal camera cannot record extremely light and alternatively dark details due to limitation of a dynamic range. High-Dynamic Range (HDR) processed images can gain better levels than normal images, whether in high light or dark light, even in the case of the large light ratio.

The HDR processed images are generally formed by combining a high exposure image and a low exposure image, enabling respective observation of details of a high light area and a low light area. Since human eyes are more sensitive to a change in brightness than to a change in color, images having more details can reflect visual effects in a real environment better.

However, the HDR processed images need to be composed using two or more images with different amounts of exposure, i.e., a signal source of a video has to be particularly fabricated. Therefore, achieving an effect of the HDR in prior art requires a complicated process.

SUMMARY

According to an aspect, an embodiment of the present disclosure provides an image processing method, comprising: determining, before displaying frame image data, grey level values of a plurality of pixels in the frame image data to be displayed and dividing all of the grey level values into a plurality of grey level areas based on a determined rule, for each grey level area of said plurality of grey level areas, comparing a first ratio and a second ratio corresponding to said grey level area with each other, wherein if said first ratio is greater than said second ratio, said grey level area is a first grey level area, and wherein if said first ratio is less than said second ratio, said grey level area is a second grey level area, wherein said first ratio is a ratio of the number of pixels whose grey level values are within said grey level area to the number of all of the pixels and wherein said second ratio is a ratio of a difference value between a maximum grey level value and a minimum grey level value in said grey level area to a maximum grey level value in said frame image data to be displayed, and adjusting grey level values included in each grey level area of said plurality of grey level areas to increase a grey level span of said first grey level area and decrease a grey level span of said second grey level area.

According to another embodiment, the step of adjusting the grey level values included in each grey level area of said plurality of grey level areas to increase the grey level span of said first grey level area and decrease the grey level span of said second grey level area comprises: positioning the pre-adjustment first grey level area in a range of the post-adjustment first grey level area and positioning the post-adjustment second grey level area in a range of the pre-adjustment second grey level area.

According to another embodiment, the step of adjusting the grey level values included in each grey level area of said plurality of grey level areas to increase the grey level span of said first grey level area and decrease the grey level span of said second grey level area comprises: for each grey level area of said plurality of grey level areas, determining a target minimum grey level value and a target maximum grey level value corresponding to said grey level area based on the minimum grey level value in said grey level area, the maximum grey level value in said grey level area, the maximum grey level value in said frame image data to be displayed and the first ratio corresponding to said grey level area, wherein a difference value between said target maximum grey level value and said target minimum grey level value is equal to a rounded value of a product obtained by multiplying the first ratio corresponding to said grey level area by the maximum grey level value in said frame image data to be displayed and wherein the target minimum grey level value corresponding to said first grey level area is less than or equal to the minimum grey level value in said first grey level area, the target maximum grey level value corresponding to said first grey level area is greater than or equal to the maximum grey level value in said first grey level area, the target minimum grey level value corresponding to said second grey level area is greater than or equal to the minimum grey level value in said second grey level area, and the target maximum grey level value corresponding to said second grey level area is less than or equal to the maximum grey level value in said second grey level area, for each grey level area of said plurality of grey level areas, determining an adjustment coefficient corresponding to said grey level area based on a ratio of the difference value between the target maximum grey level value and the target minimum grey level value corresponding to said grey level area to the difference value between the maximum grey level value and the minimum grey level value in said grey level area, and for each grey level area of said plurality of grey level areas, calculating y-values corresponding to grey level values x included in said grey level area in accordance with a formula $y - Y_0 = K \cdot (x - X_0)$, and rounding the y-values to obtain the adjusted grey level values, wherein K denotes the adjustment coefficient corresponding to said grey level area, $Y_0$ denotes the target minimum grey level value corresponding to said grey level area and $X_0$ denotes the minimum grey level value in said grey level area.

According to another embodiment, adjacent target maximum grey level value and target minimum grey level value corresponding to two adjacent grey level areas of said plurality of grey level areas are equal.

According to another embodiment, after adjusting the grey level values included in each grey level area of said plurality of grey level areas and before displaying the frame image data, said method further comprises: decreasing the adjusted grey level values included in each grey level area in a preset scale and rounding the decreased values.

According to another embodiment, after comparing, for each grey level area of said plurality of grey level areas, the first ratio and the second ratio corresponding to said grey level area, said method further comprises: if said first ratio is equal to said second ratio, keeping grey level values in said grey level area unchanged.

According to another aspect, an embodiment of the present invention also provides an image processing apparatus comprising: an area division unit configured to determine, before frame image data is displayed, grey level values of a plurality of pixels in the frame image data to be displayed and to divide all of the grey level values into a plurality of grey level areas based on a determined rule, a comparison unit configured to compare, for each grey level area of said plurality of grey level areas, a first ratio and a second ratio corresponding to said grey level area with each other, wherein if said first ratio is greater than said second ratio, said grey level area is a first grey level area, and wherein if said first ratio is less than said second ratio, said grey level area is a second grey level area, wherein said first ratio is a ratio of the number of pixels whose grey level values are within said grey level area to the number of all of the pixels and wherein said second ratio is a ratio of a difference value between a maximum grey level value and a minimum grey level value in said grey level area to a maximum grey level value in said frame image data to be displayed, and an adjustment unit configured to adjust grey level values included in each grey level area of said plurality of grey level areas to increase a grey level span of said first grey level area and decrease a grey level span of said second grey level area.

According to another embodiment, said adjustment unit is further configured to position the pre-adjustment first grey level area in a range of the post-adjustment first grey level area and to position the post-adjustment second grey level area in a range of the pre-adjustment second grey level area.

According to another embodiment, said adjustment unit comprises: a first determination module configured to determine, for each grey level area of said plurality of grey level areas, a target minimum grey level value and a target maximum grey level value corresponding to said grey level area based on the minimum grey level value in said grey level area, the maximum grey level value in said grey level area, the maximum grey level value in said frame image data to be displayed and the first ratio corresponding to said grey level area, wherein a difference value between said target maximum grey level value and said target minimum grey level value is equal to a rounded value of a product obtained by multiplying the first ratio corresponding to said grey level area by the maximum grey level value in said frame image data to be displayed and wherein the target minimum grey level value corresponding to said first grey level area is less than or equal to the minimum grey level value in said first grey level area, the target maximum grey level value corresponding to said first grey level area is greater than or equal to the maximum grey level value in said first grey level area, the target minimum grey level value corresponding to said second grey level area is greater than or equal to the minimum grey level value in said second grey level area, and the target maximum grey level value corresponding to said second grey level area is less than or equal to the maximum grey level value in said second grey level area, a second determination module configured to determine, for each grey level area of said plurality of grey level areas, an adjustment coefficient corresponding to said grey level area based on a ratio of the difference value between the target maximum grey level value and the target minimum grey level value corresponding to said grey level area to the difference value between the maximum grey level value and the minimum grey level value in said grey level area, and a grey level conversion module configured to calculate, for each grey level area of said plurality of grey level areas, y-values corresponding to grey level values x included in said grey level area in accordance with a formula $y-Y_0=K \cdot (x-X_0)$, and to round the y-values to obtain the adjusted grey level values, wherein K denotes the adjustment coefficient corresponding to said grey level area, $Y_0$ denotes the target minimum grey level value corresponding to said grey level area and $X_0$ denotes the minimum grey level value in said grey level area.

According to another embodiment, adjacent target maximum grey level value and target minimum grey level value corresponding to two adjacent grey level areas of said plurality of grey level areas are equal.

According to another embodiment, the image processing apparatus may further comprise a value decreasing unit configured to decrease, after the grey level values included in each grey level area of said plurality of grey level areas are adjusted by the adjustment unit and before the frame image data is displayed, the adjusted grey level values included in each grey level area in a preset scale and round the decreased values.

According to another embodiment, said adjustment unit is further configured to keep grey level values in said grey level area unchanged when it is determined through the comparison by said comparison unit that said first ratio is equal to said second ratio.

According to yet another aspect, an embodiment of the present disclosure also provides a display apparatus comprising any of the foregoing image processing apparatuses provided by the embodiments of the present disclosure.

BRIEF DESCRIPTION OF THE DRAWINGS

FIG. 1 is a flowchart of an image processing method provided in an embodiment of the present disclosure.

FIG. 2 is a flowchart for adjusting grey level values included in each grey level area of a plurality of grey level areas in the image processing method provided in an embodiment of the present disclosure.

DETAILED DESCRIPTION

Figure 3:
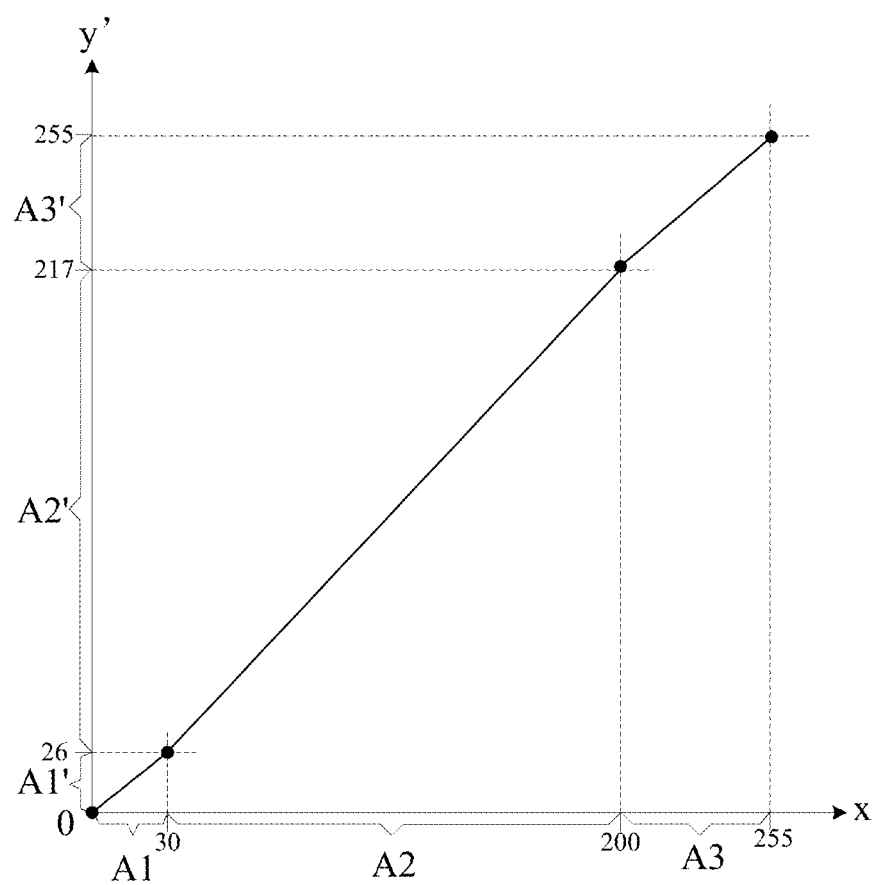
FIG. 3 is graph illustrating a relationship between a plurality of pre-adjustment grey level areas and a plurality of post-adjustment grey level areas in the image processing method according to one embodiment of the present disclosure.

The detailed description of the image processing method, the image processing apparatus and the display apparatus provided in the embodiments of the present disclosure is explained in detail below in connection with the accompanying figures.

An embodiment of the present disclosure provides an image processing method. As illustrated in FIG. 1, the image processing method may comprise the following steps.

In S101, before frame image data is displayed, grey level values of a plurality of pixels in the frame image data to be displayed are determined and all of the grey level values are divided into a plurality of grey level areas based on a determined rule.

In S102, for each grey level area of the plurality of grey level areas, a first ratio and a second ratio corresponding to the grey level area are compared with each other. If the first ratio is greater than the second ratio, the grey level area is a first grey level area, and if the first ratio is less than the second ratio, the grey level area is a second grey level area. The first ratio is a ratio of the number of pixels whose grey level values are within the grey level area to the number of all of the pixels and the second ratio is a ratio of a difference value between a maximum grey level value and a minimum grey level value in the grey level area to a maximum grey level value in the frame image data to be displayed.

In S103, grey level values included in each grey level area of the plurality of grey level areas are adjusted to increase a grey level span of the first grey level area and decrease a grey level span of the second grey level area.

In the above image processing method provided in the embodiment of the present disclosure, before the frame image data is displayed, all of the grey level values of the frame image data to be displayed are divided into the plurality of grey level areas. Then, a type of each of the grey level areas is determined to be a first grey level area or a second grey level area based on a result of the comparison between the first ratio and the second ratio corresponding to each of the grey level areas. Finally, the grey level values included in each grey level area are adjusted to increase the grey level span of the first grey level area and decrease the grey level span of the second grey level area, and the frame image data is displayed based on the adjusted grey level values. That is, the above image processing method allows a range of the first grey level area in the to-be-displayed frame image data to be increased and a range of the second grey level area to be decreased.

It is noted that in the above image processing method provided in the embodiment of the present disclosure, the grey level span of the grey level area refers to a difference value between two adjacent grey level values of the plurality of grey level values arranged in order of size in the grey level area. For example, assuming that grey level values included in a first grey level area are 2, 4 and 6 respectively, the grey level span between the grey level values of 2 and 4 is 2 and the grey level span between the grey level values of 4 and 6 is 2. In the case that the grey level values included in this first grey level area adjusted in order to increase the grey level span of this first grey level area, assuming that the grey level value of 2 becomes 1, that the grey level value of 4 remains unchanged and that the grey level value of 6 becomes 7, then in the adjusted first grey level area, the grey level span between the grey level values of 1 and 4 is 3 and the grey level span between the grey level values of 4 and 7 is 3.

Further, the step of adjusting the grey level values included in each grey level area of the plurality of grey level areas to increase the grey level span of the first grey level area and decrease the grey level span of the second grey level area may comprise: positioning the pre-adjustment first grey level area in a range of the post-adjustment first grey level area and positioning the post-adjustment second grey level area in a range of the pre-adjustment second grey level area. That is, each of the first grey level areas is area-expanded and each of the second grey level areas is area-compressed, thereby making a difference in brightness between pixels whose grey level values are within the first grey level area larger and a difference in brightness between pixels whose grey level values are within the second grey level area smaller.

Further, as illustrated in FIG. 2, the above step S103 may comprise following steps.

In S201, for each grey level area of the plurality of grey level areas, a target minimum grey level value and a target maximum grey level value corresponding to the grey level area are determined based on the minimum grey level value in the grey level area, the maximum grey level value in the grey level area, the maximum grey level value in the frame image data to be displayed and the first ratio corresponding to the grey level area. A difference value between the target maximum grey level value and the target minimum grey level value is equal to a rounded value of a product obtained by multiplying the first ratio corresponding to the grey level area by the maximum grey level value in the frame image data to be displayed. Moreover, the target minimum grey level value corresponding to the first grey level area is less than or equal to the minimum grey level value in this first grey level area. The target maximum grey level value corresponding to the first grey level area is greater than or equal to the maximum grey level value in this first grey level area. The target minimum grey level value corresponding to the second grey level area is greater than or equal to the minimum grey level value in this second grey level area. The target maximum grey level value corresponding to the second grey level area is less than or equal to the maximum grey level value in this second grey level area.

For example, assuming that a minimum grey level value in a second grey level area is 0 and that a maximum grey level value in this second grey level area is 49, a first ratio corresponding to this second grey level area is 10%. Assuming that a minimum grey level value in a first grey level area is 50 and that a maximum grey level value in this first grey level area is 200, a first ratio corresponding to this first grey level area is 80%. Moreover, assume that a maximum grey level value in the frame image data to be displayed is 255. A target minimum grey level value corresponding to the first grey level area may be made less than or equal to the minimum grey level value in this first grey level area, a target maximum grey level value corresponding to the first grey level area may be made greater than or equal to the maximum grey level value in this first grey level area, a target minimum grey level value corresponding to the second grey level area may be made greater than or equal to the minimum grey level value in this second grey level area, and a target maximum grey level value corresponding to the second grey level area may be made less than or equal to the maximum grey level value in this second grey level area. Moreover, a difference value between the target maximum grey level value and the target minimum grey level value may be made equal to a rounded value of a product obtained by multiplying the first ratio corresponding to the grey level area by the maximum grey level value in the frame image data to be displayed. For example, the target minimum grey level value corresponding to this second grey level area takes a value of 0. Since the difference value between the target maximum grey level value and the target minimum grey level value corresponding to this second grey level area is equal to a rounded value of a product obtained by multiplying the first ratio corresponding to this second grey level area by the maximum grey level value in the frame image data to be displayed, the target maximum grey level value should be 26 in accordance with $0+10\% \times 255 \approx 26$. For example, the target minimum grey level value corresponding to this first grey level area takes a value of 30, the target maximum grey level value corresponding to this first grey level area should be 234 in accordance with 30+80%× 255=234.

In S202, for each grey level area of the plurality of grey level areas, an adjustment coefficient corresponding to the grey level area is determined based on a ratio of the difference value between the target maximum grey level value and the target minimum grey level value corresponding to the grey level area to the difference value between the maximum grey level value and the minimum grey level value in the grey level area.

For example, in the above example, the minimum grey level value in the second grey level area is 0, the maximum grey level value is 49, the target minimum grey level value corresponding to the second grey level area is 0, and the target maximum grey level value corresponding to the second grey level area is 26. Thus, the adjustment coefficient corresponding to this second grey level area is 26/49. In the above example, the minimum grey level value in the first grey level area is 50, the maximum grey level value is 200, the target minimum grey level value corresponding to the first grey level area is 30, and the target maximum grey level value corresponding to the first grey level area is 234. Thus, the adjustment coefficient corresponding to this first grey level area is 204/150.

In S203, for each grey level area of the plurality of grey level areas, y-values corresponding to grey level values x included in this grey level area are calculated in accordance with a formula $y-Y_0=K \cdot (x-X_0)$, and the y-values are rounded to obtain the adjusted grey level values. K denotes the adjustment coefficient corresponding to the grey level area, $Y_0$ denotes the target minimum grey level value corresponding to the grey level area and $X_0$ denotes the minimum grey level value in the grey level area.

For example, for the second grey level area in the above example, y-values corresponding to grey level values x included in this second grey level area may be calculated in accordance with a formula $y=26/49 \cdot x$, and the y-values are rounded to obtain the adjusted grey level values. For example, when the grey level values x in the second grey level area are equal to 30, the formula results in $y=26/49 \cdot x=26/49 \cdot 30 \approx 15.92$, and then the value of 15.92 is rounded to lead to a grey level value of 16 obtained by adjusting the grey level values of 30 in the second grey level area. Likewise, for the first grey level area in the above example, y-values corresponding to grey level values x included in this first grey level area are calculated in accordance with a formula $y-30=204/150 \cdot (x-50)$, and the y-values are rounded to obtain the adjusted grey level values. For example, when the grey level values x in the first grey level area are equal to 150, the formula results in $y=204/150 \cdot (x-50)+30=204/150 \cdot (150-50)+30=166$, and then the value of 166 is rounded to lead to a grey level value of 166 obtained by adjusting the grey level values of 150 in the first grey level area.

According to another embodiment, adjacent target maximum grey level value and target minimum grey level value corresponding to two adjacent grey level areas of the plurality of grey level areas are equal.

For example, assuming that in the above example the second grey level area and the first grey level area are adjacent grey level areas, the target maximum grey level value of 26 corresponding to the second grey level area and the target minimum grey level value of 30 corresponding to the first grey level area are adjacent target maximum grey level value and target minimum grey level value. Therefore, in order to make the adjacent target maximum grey level value and target minimum grey level value corresponding to the two adjacent grey level areas equal to each other, the target maximum grey level value corresponding to the second grey level area and the target minimum grey level value corresponding to the first grey level area may be selected as the same value. For example, the two values may be selected as 26, 28, 30 or 35, etc.

The determined rule for dividing all of the grey level values into the plurality of grey level areas may be a rule determined based on image data, or may be predetermined, which will not be set forth in detail herein.

In the following, the above image processing method will be described by way of example in a specific embodiment.
(1) Before frame image data is displayed, grey level values of a plurality of pixels in the frame image data to be displayed are determined and all of the grey level values are divided into a plurality of grey level areas based on a determined rule. For example, as shown in FIG. 3, the grey level values 0~30 form a grey level area A1, the grey level values 31~200 form a grey level area A2, and the grey level values 201~255 form a grey level area A3. Assuming that there are 100 pixels in all, the number of pixels whose grey level values are within the grey level area A1 is 10, the number of pixels whose grey level values are within the grey level area A2 is 75, and the number of pixels whose grey level values are within the third grey level area is 15.
(2) For the grey level area A1, its corresponding first ratio is 10% and its corresponding second ratio is 30/255. Since 10%<30/255, the grey level area A1 is the second grey level area. For the grey level area A2, its corresponding first ratio is 75% and its corresponding second ratio is 169/225. Since 75%>169/255, the grey level area A2 is the first grey level area. For the grey level area A3, its corresponding first ratio is 15% and its corresponding second ratio is 54/255. Since 15%<54/255, the grey level area A3 is the second grey level area.
(3) For each grey level area of the plurality of grey level areas A1, A2 and A3, the target minimum grey level value and the target maximum grey level value corresponding to the grey level area are determined based on the minimum grey level value in the grey level area, the maximum grey level value in the grey level area, the maximum grey level value in the frame image data to be displayed and the first ratio corresponding to the grey level area. The target minimum grey level value corresponding to the first grey level area is less than or equal to the minimum grey level value in this first grey level area, and the target maximum grey level value corresponding to the first grey level area is greater than or equal to the maximum grey level value in this first grey level area. The target minimum grey level value corresponding to the second grey level area is greater than or equal to the minimum grey level value in this second grey level area, and the target maximum grey level value corresponding to the second grey level area is less than or equal to the maximum grey level value in this second grey level area. The difference value between the target maximum grey level value and the target minimum grey level value corresponding to the grey level area is equal to a rounded value of a product obtained by multiplying the first ratio corresponding to the grey level area by the maximum grey level value in the frame image data to be displayed. The adjacent target maximum grey level value and the target minimum grey level value corresponding to the two adjacent grey level areas may be equal to each other. Assuming that the target minimum grey level value corresponding to the second grey level area A1 takes a value of 0, then 0+10%×255=25.5 and the value of 25.5 is rounded, so the target maximum grey level value corresponding to the second grey level area A1 should be 26. Assuming that the target minimum grey level value corresponding to the first grey level area A2 is 26, then 26+75%×255=217.25 and the value of 217.25 is rounded, so the target maximum grey level value corresponding to the first grey level area A2 should be 217. Assuming that the target minimum grey level value corresponding to the second grey level area A3 is 217, then 217+15%×255=255.25 and the value of 255.25 is rounded, so the target maximum grey level value corresponding to the second grey level area A3 should be 255.

(4) Based on the ratio 26/30 of the difference value 26 between the target maximum grey level value 26 and the target minimum grey level value 0 corresponding to the second grey level area A1 to the difference value 30 between the maximum grey level value 30 and the minimum grey level value 0 in this second grey level area A1, the adjustment coefficient corresponding to the second grey level area A1 is determined to be 26/30. Based on the ratio 191/169 of the difference value 191 between the target maximum grey level value 217 and the target minimum grey level value 26 corresponding to the first grey level area A2 to the difference value 169 between the maximum grey level value 200 and the minimum grey level value 31 in this first grey level area A2, the adjustment coefficient corresponding to the first grey level area A2 is determined to be 191/169. Based on the ratio 26/30 of the difference value 38 between the target maximum grey level value 255 and the target minimum grey level value 217 corresponding to the second grey level area A3 to the difference value 54 between the maximum grey level value 255 and the minimum grey level value 201 in this second grey level area A3, the adjustment coefficient corresponding to the second grey level area A3 is determined to be 38/54.

(5) For the second grey level area A1, in accordance with a formula y=26/30·x, y-values corresponding to grey level values x included in this second grey level area A1 are calculated, and the y-values are rounded to obtain grey level values y' included in the adjusted second grey level area A1'. Likewise, for the first grey level area A2, in accordance with a formula y−26=191/169·(x−31), y-values corresponding to grey level values x included in this first grey level area A2 are calculated, and the y-values are rounded to obtain grey level values y' included in the adjusted first grey level area A2'. Likewise, for the second grey level area A3, in accordance with a formula y−217=38/54·(x−201), y-values corresponding to grey level values x included in this second grey level area A3 are calculated, and the y-values are rounded to obtain grey level values y' included in the adjusted second grey level area A3'.

According to another embodiment, after the grey level values included in each grey level area of the plurality of grey level areas are adjusted and before the frame image data is displayed, the image processing method may further comprise: decreasing the adjusted grey level values included in each grey level area in a preset scale and rounding the decreased values.

In specific implementations, the rounding of the values is based on e.g. a rounding-up and rounding-down principle, which will not be set forth in detail herein.

Through three experiments, an image obtained without image processing is compared to an image obtained after the image processing is performed by the image processing method provided in the embodiment of the present disclosure.

Figure 4A:
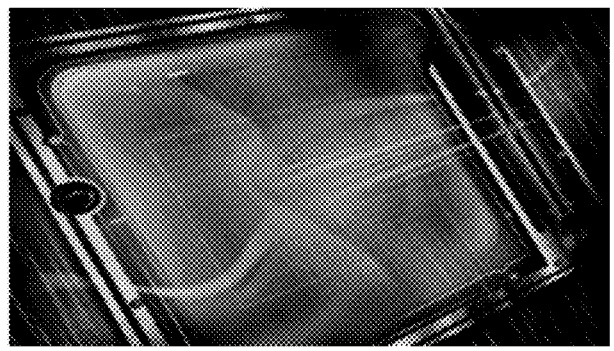
FIGS. 4a-4c are image presentation diagrams provided in Experiment I of the present disclosure.
Figure 4B:
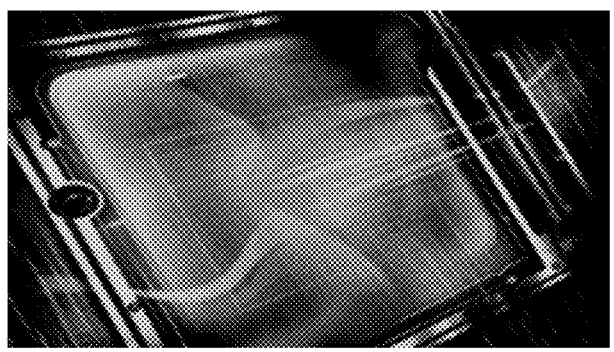
Figure 4C:
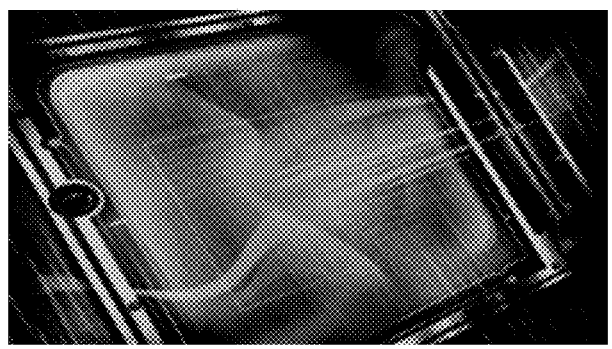

Experiment I: As illustrated in FIGS. 4a-4c, FIG. 4a represents an image which is not processed, FIG. 4b represents an image obtained after the image processing is performed by the image processing method according to the above embodiment of the present disclosure and FIG. 4c represents an image obtained by decreasing the adjusted grey level values included in each grey level area in a preset scale and rounding the decreased values based on the image processing method according to the above embodiment of the present disclosure. It may be seen from FIGS. 4a-4c that FIG. 4b shows the image having the best display effect. Although a display effect of FIG. 4c is not as good as the display effect of FIG. 4b, the display effect of FIG. 4c is significantly improved as compared to FIG. 4a. Moreover, it is found by comparing power consumption corresponding to the images shown in FIGS. 4a-4c that the power consumption corresponding to FIG. 4b is 1.104 times that of FIG. 4a and the power consumption corresponding to FIG. 4c is 0.967 times that of FIG. 4a.

Figure 5A:
FIGS. 5a-5c are image presentation diagrams provided in Experiment II of the present disclosure.
Figure 5B:
Figure 5C:

Experiment II: As illustrated in FIGS. 5a-5c, FIG. 5a represents an image which is not processed, FIG. 5b represents an image obtained after the image processing is performed by the image processing method according to the above embodiment of the present disclosure and FIG. 5c represents an image obtained by decreasing the adjusted grey level values included in each grey level area in a preset scale and rounding the decreased values based on the image processing method according to the above embodiment of the present disclosure. It may be seen from FIGS. 5a-5c that FIG. 5b shows the image having the best display effect. Although a display effect of FIG. 5c is not as good as the display effect of FIG. 5b, the display effect of FIG. 5c is significantly improved as compared to FIG. 5a. Moreover, it is found by comparing power consumption corresponding to the images shown in FIGS. 5a-c that the power consumption corresponding to FIG. 5b is 1.164 times that of FIG. 5a and the power consumption corresponding to FIG. 5c is 1.018 times that of FIG. 5a.

Figure 6A:
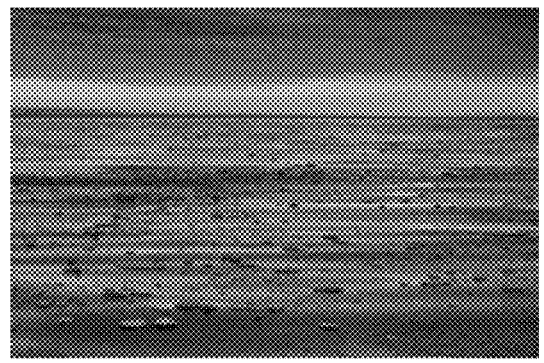
FIGS. 6a-6c are image presentation diagrams provided in Experiment III of the present disclosure.
Figure 6B:
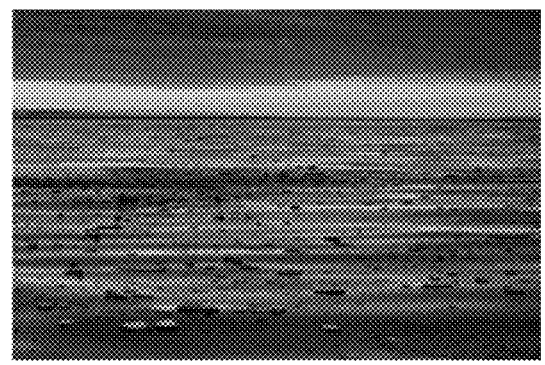
Figure 6C:
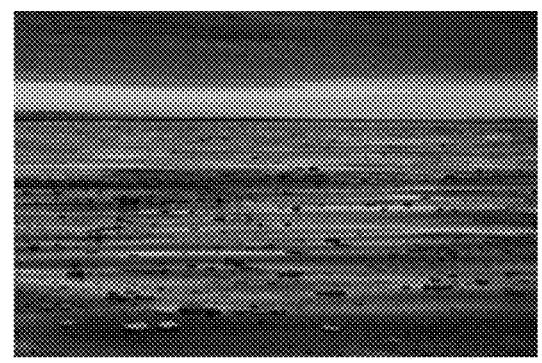

Experiment III: As illustrated in FIGS. 6a-6c, FIG. 6a represents an image which is not processed, FIG. 6b represents an image obtained after the image processing is performed by the image processing method according to the above embodiment of the present disclosure and FIG. 6c represents an image obtained by decreasing the adjusted grey level values included in each grey level area in a preset scale and rounding the decreased values based on the image processing method according to the above embodiment of the present disclosure. It may be seen from FIGS. 6a-6c that FIG. 6b shows the image having the best display effect. Although a display effect of FIG. 6c is not as good as the display effect of FIG. 6b, the display effect of FIG. 6c is significantly improved as compared to FIG. 6a. Moreover, it is found by comparing power consumption corresponding to the images shown in FIGS. 6a-6c that the power consumption corresponding to FIG. 6b is 1.029 times that of FIG. 6a and the power consumption corresponding to FIG. 6c is 0.907 times that of FIG. 6a.

According to another embodiment, after comparing, for each grey level area of the plurality of grey level areas, the first ratio and the second ratio corresponding to the grey level area, the image processing method may further comprise: if the first ratio is equal to the second ratio, keeping grey level values in the grey level area unchanged. That is, the grey level values are not adjusted.

Figure 7:
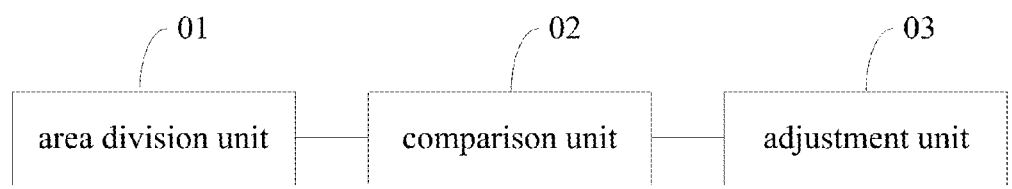
FIG. 7 is a structural schematic diagram of the image processing apparatus provided in an embodiment of the present disclosure.

Based on the same inventive concept, an embodiment of the present disclosure also provides an image processing apparatus. As illustrated in FIG. 7, the image processing apparatus according to the embodiment of the present disclosure may comprise the following units.

An area division unit 01 is configured to determine, before frame image data is displayed, grey level values of a plurality of pixels in the frame image data to be displayed and to divide all of the grey level values into a plurality of grey level areas based on a determined rule.

A comparison unit 02 is configured to compare, for each grey level area of the plurality of grey level areas, a first ratio and a second ratio corresponding to the grey level area with each other, wherein if the first ratio is greater than the second ratio, the grey level area is a first grey level area, and wherein if the first ratio is less than the second ratio, the grey level area is a second grey level area. The first ratio is a ratio of the number of pixels whose grey level values are within the grey level area to the number of all of the pixels. The second ratio is a ratio of a difference value between a maximum grey level value and a minimum grey level value in the grey level area to a maximum grey level value in the frame image data to be displayed.

An adjustment unit 03 is configured to adjust grey level values included in each grey level area of the plurality of grey level areas to increase a grey level span of the first grey level area and decrease a grey level span of the second grey level area.

According to another embodiment, the adjustment unit 03 may be further configured to position the pre-adjustment first grey level area in a range of the post-adjustment first grey level area and to position the post-adjustment second grey level area in a range of the pre-adjustment second grey level area.

Figure 8:
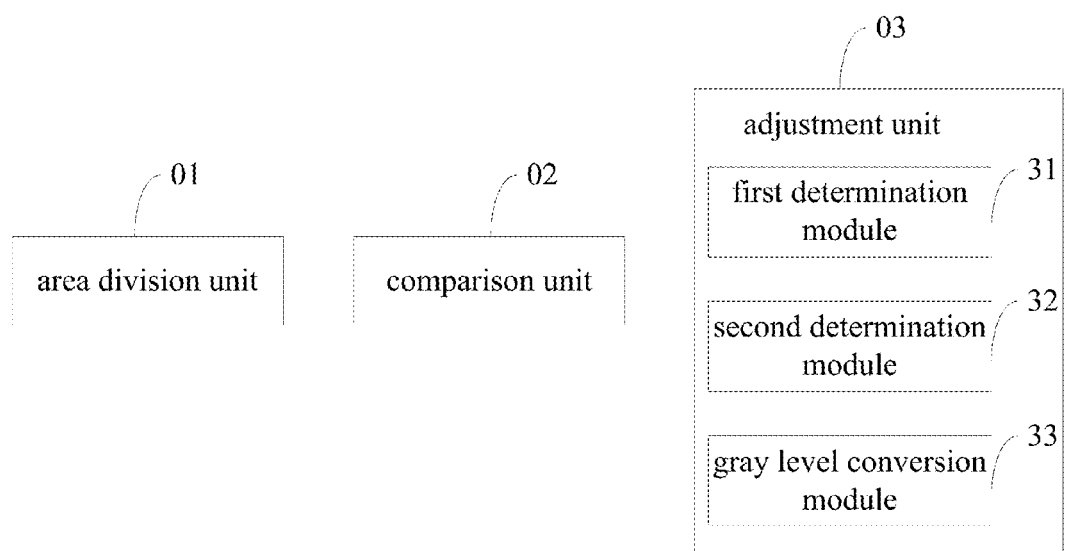
FIG. 8 is another structural schematic diagram of the image processing apparatus provided in an embodiment of the present disclosure.

According to another embodiment, as illustrated in FIG. 8, the adjustment unit 03 may comprise the following modules.

A first determination module 31 is configured to determine, for each grey level area of the plurality of grey level areas, a target minimum grey level value and a target maximum grey level value corresponding to the grey level area based on the minimum grey level value in the grey level area, the maximum grey level value in the grey level area, the maximum grey level value in the frame image data to be displayed and the first ratio corresponding to the grey level area. A difference value between the target maximum grey level value and the target minimum grey level value is equal to a rounded value of a product obtained by multiplying the first ratio corresponding to the grey level area by the maximum grey level value in the frame image data to be displayed. Moreover, the target minimum grey level value corresponding to the first grey level area is less than or equal to the minimum grey level value in the first grey level area, and the target maximum grey level value corresponding to the first grey level area is greater than or equal to the maximum grey level value in the first grey level area. The target minimum grey level value corresponding to the second grey level area is greater than or equal to the minimum grey level value in the second grey level area, and the target maximum grey level value corresponding to the second grey level area is less than or equal to the maximum grey level value in the second grey level area, A second determination module 32 is configured to determine, for each grey level area of the plurality of grey level areas, an adjustment coefficient corresponding to the grey level area based on a ratio of the difference value between the target maximum grey level value and the target minimum grey level value corresponding to the grey level area to the difference value between the maximum grey level value and the minimum grey level value in the grey level area.

A grey level conversion module 33 is configured to calculate, for each grey level area of the plurality of grey level areas, y-values corresponding to grey level values x included in the grey level area in accordance with a formula $y - Y_0 = K \cdot (x - X_0)$, and to round the y-values to obtain the adjusted grey level values. K denotes the adjustment coefficient corresponding to the grey level area, $Y_0$ denotes the target minimum grey level value corresponding to the grey level area and $X_0$ denotes the minimum grey level value in the grey level area.

According to another embodiment, adjacent target maximum grey level value and target minimum grey level value corresponding to two adjacent grey level areas of the plurality of grey level areas are equal.

According to another embodiment, the image processing apparatus may further comprise a value decreasing unit. The value decreasing unit is configured to decrease, after the grey level values included in each grey level area of the plurality of grey level areas are adjusted by the adjustment unit and before the frame image data is displayed, the adjusted grey level values included in each grey level area in a preset scale and round the decreased values.

According to another embodiment, the adjustment unit is further configured to keep grey level values in the grey level area unchanged when it is determined through the comparison by the comparison unit that the first ratio is equal to the second ratio.

In specific implementations, a principle by which the above image processing apparatus provided in the embodiment of the present disclosure solves the technical problem is the same as that for the image processing method provided in the above embodiment, so it will not be set forth in detail herein.

Based on the same inventive concept, the embodiment of the present disclosure also provides a display apparatus comprising any one of the above image processing apparatuses provided in the embodiments of the present disclosure. The display apparatus may for example comprise a display panel and other components mating therewith, which will not be set forth in detail herein. For example, the display apparatus may be any product or component having a display function, such as a handset, a tablet, a TV set, a display, a notebook, a digital photo frame, a navigator, etc. An implementation of the display apparatus may refer to the embodiment of the above image processing apparatus, which will not be set forth in detail herein.

The embodiments of the present disclosure provide an image processing method, an image processing apparatus and a display apparatus. Before frame image data is displayed, all of the grey level values of the frame image data to be displayed are divided into the plurality of grey level areas. Then, a type of each of the grey level areas is determined to be a first grey level area or a second grey level area based on a result of the comparison between the first ratio and the second ratio corresponding to each of the grey level areas. Finally, the grey level values included in each grey level area are adjusted to increase the grey level span of the first grey level area and decrease the grey level span of the second grey level area, and the frame image data is displayed based on the adjusted grey level values. That is, the above image processing method allows a range of the first grey level area in the to-be-displayed frame image data to be increased and a range of the second grey level area to be decreased.

Those people having ordinary skills in the art may apparently make various adaptations and variations to the embodiments of the present disclosure without deviating from a spirit and scope of the present disclosure. In this respect, in the case that such modifications and variations to the embodiments of the present disclosure fall within the scope of the claims of the present disclosure and their technical equivalents, it is also intended that the present disclosure encompass these adaptations and variations.

The invention claimed is:

1. An image processing method, comprising:
   determining, before displaying frame image data, grey level values of a plurality of pixels in the frame image data to be displayed and dividing all of the grey level values into a plurality of grey level areas based on a determined rule,
   for each grey level area of said plurality of grey level areas, comparing a first ratio and a second ratio, wherein if said first ratio is greater than said second ratio, said each grey level area is a first grey level area, and wherein if said first ratio is less than said second ratio, said each grey level area is a second grey level area, wherein said first ratio is a ratio of a number of pixels whose grey level values are within said each grey level area to a number of all of the pixels and wherein said second ratio is a ratio of a difference value between a maximum grey level value and a minimum grey level value in said each grey level area to a maximum grey level value in said frame image data to be displayed, and
   adjusting grey level values included in said each grey level area of said plurality of grey level areas to increase a grey level span of said first grey level area and decrease a grey level span of said second grey level area.

2. The image processing method according to claim 1, wherein the step of adjusting the grey level values included in said each grey level area of said plurality of grey level areas to increase the grey level span of said first grey level area and decrease the grey level span of said second grey level area comprises:
   positioning a pre-adjustment first grey level area in a range of a post-adjustment first grey level area and positioning a post-adjustment second grey level area in a range of a pre-adjustment second grey level area.

3. The image processing method according to claim 2, wherein the step of adjusting the grey level values included in said each grey level area of said plurality of grey level areas to increase the grey level span of said first grey level area and decrease the grey level span of said second grey level area comprises:
   for said each grey level area of said plurality of grey level areas, determining a target minimum grey level value and a target maximum grey level value corresponding to said each grey level area based on the minimum grey level value in said each grey level area, the maximum grey level value in said each grey level area, the maximum grey level value in said frame image data to be displayed and the first ratio corresponding to said each grey level area, wherein a difference value between said target maximum grey level value and said target minimum grey level value is equal to a rounded value of a product obtained by multiplying the first ratio corresponding to said each grey level area by the maximum grey level value in said frame image data to be displayed and wherein the target minimum grey level value corresponding to said first grey level area is less than or equal to the minimum grey level value in said first grey level area, the target maximum grey level value corresponding to said first grey level area is greater than or equal to the maximum grey level value in said first grey level area, the target minimum grey level value corresponding to said second grey level area is greater than or equal to the minimum grey level value in said second grey level area, and the target maximum grey level value corresponding to said second grey level area is less than or equal to the maximum grey level value in said second grey level area,
   for said each grey level area of said plurality of grey level areas, determining an adjustment coefficient corresponding to said each grey level area based on a ratio of the difference value between the target maximum grey level value and the target minimum grey level value corresponding to said each grey level area to the difference value between the maximum grey level value and the minimum grey level value in said each grey level area, and
   for said each grey level area of said plurality of grey level areas, calculating y-values corresponding to grey level values x included in said each grey level area in accordance with a formula $y-Y_0=K\cdot(x-X_0)$, and rounding the y-values to obtain the adjusted grey level values, wherein K denotes the adjustment coefficient corresponding to said each grey level area, $Y_0$ denotes the target minimum grey level value corresponding to said each grey level area and $X_0$ denotes the minimum grey level value in said each grey level area.

4. The image processing method according to claim 3, wherein adjacent target maximum grey level value and target minimum grey level value corresponding to two adjacent grey level areas of said plurality of grey level areas are equal.

5. The image processing method according to claim 1, wherein after adjusting the grey level values included in said each grey level area of said plurality of grey level areas and before displaying the frame image data, said method further comprises:
   decreasing the adjusted grey level values included in said each grey level area using a preset scale and rounding the decreased values.

6. The image processing method according to claim 1, wherein after comparing the first ratio and the second ratio, said method further comprises:
   if said first ratio is equal to said second ratio, keeping said grey level values in said each grey level area unchanged.

7. An image processing apparatus comprising:
   an area division unit configured to determine, before frame image data is displayed, grey level values of a plurality of pixels in the frame image data to be displayed and to divide all of the grey level values into a plurality of grey level areas based on a determined rule,
   a comparison unit configured to compare, for said each grey level area of said plurality of grey level areas, a first ratio and a second ratio, wherein if said first ratio is greater than said second ratio, said each grey level area is a first grey level area, and wherein if said first ratio is less than said second ratio, said each grey level area is a second grey level area, wherein said first ratio is a ratio of a number of pixels whose grey level values are within said each grey level area to a number of all of the pixels and wherein said second ratio is a ratio of a difference value between a maximum grey level value and a minimum grey level value in said each grey level area to a maximum grey level value in said frame image data to be displayed, and an adjustment unit configured to adjust grey level values included in said each grey level area of said plurality of grey level areas to increase a grey level span of said first grey level area and decrease a grey level span of said second grey level area.

8. The image processing apparatus according to claim 7, wherein said adjustment unit is further configured to position a pre-adjustment first grey level area in a range of a post-adjustment first grey level area and to position the post-adjustment second grey level area in a range of the pre-adjustment second grey level area.

9. The image processing apparatus according to claim 8, wherein said adjustment unit comprises:

a first determination module configured to determine, for said each grey level area of said plurality of grey level areas, a target minimum grey level value and a target maximum grey level value corresponding to said each grey level area based on the minimum grey level value in said each grey level area, the maximum grey level value in said each grey level area, the maximum grey level value in said frame image data to be displayed and the first ratio corresponding to said each grey level area, wherein a difference value between said target maximum grey level value and said target minimum grey level value is equal to a rounded value of a product obtained by multiplying the first ratio corresponding to said each grey level area by the maximum grey level value in said frame image data to be displayed and wherein the target minimum grey level value corresponding to said first grey level area is less than or equal to the minimum grey level value in said first grey level area, the target maximum grey level value corresponding to said first grey level area is greater than or equal to the maximum grey level value in said first grey level area, the target minimum grey level value corresponding to said second grey level area is greater than or equal to the minimum grey level value in said second grey level area, and the target maximum grey level value corresponding to said second grey level area is less than or equal to the maximum grey level value in said second grey level area, a second determination module configured to determine, for each grey level area of said plurality of grey level areas, an adjustment coefficient corresponding to said each grey level area based on a ratio of the difference value between the target maximum grey level value and the target minimum grey level value corresponding to said each grey level area to the difference value between the maximum grey level value and the minimum grey level value in said each grey level area, and a grey level conversion module configured to calculate, for said each grey level area of said plurality of grey level areas, y-values corresponding to grey level values x included in said each grey level area in accordance with a formula $y-Y_0=K \cdot (x-X_0)$, and to round the y-values to obtain the adjusted grey level values, wherein K denotes the adjustment coefficient corresponding to said each grey level area, $Y_0$ denotes the target minimum grey level value corresponding to said each grey level area and $X_0$ denotes the minimum grey level value in said each grey level area.

10. The image processing apparatus according to claim 9, wherein adjacent target maximum grey level value and target minimum grey level value corresponding to two adjacent grey level areas of said plurality of grey level areas are equal.

11. The image processing apparatus according to claim 10, further comprising a value decreasing unit configured to decrease, after the grey level values included in said each grey level area of said plurality of grey level areas are adjusted by the adjustment unit and before the frame image data is displayed, the adjusted grey level values included in said each grey level area in a preset scale and round the decreased values.

12. The image processing apparatus according to claim 10, wherein said adjustment unit is further configured to keep grey level values in said each grey level area unchanged when it is determined through the comparison by said comparison unit that said first ratio is equal to said second ratio.

13. The image processing apparatus according to claim 9, further comprising a value decreasing unit configured to decrease, after the grey level values included in said each grey level area of said plurality of grey level areas are adjusted by the adjustment unit and before the frame image data is displayed, the adjusted grey level values included in said each grey level area in a preset scale and round the decreased values.

14. The image processing apparatus according to claim 9, wherein said adjustment unit is further configured to keep said grey level values in said each grey level area unchanged when it is determined through the comparison by said comparison unit that said first ratio is equal to said second ratio.

15. The image processing apparatus according to claim 8, further comprising a value decreasing unit configured to decrease, after the grey level values included in said each grey level area of said plurality of grey level areas are adjusted by the adjustment unit and before the frame image data is displayed, the adjusted grey level values included in said each grey level area in a preset scale and round the decreased values.

16. The image processing apparatus according to claim 8, wherein said adjustment unit is further configured to keep grey level values in said each grey level area unchanged when it is determined through the comparison by said comparison unit that said first ratio is equal to said second ratio.

17. The image processing apparatus according to claim 7, further comprising a value decreasing unit configured to decrease, after the grey level values included in each said grey level area of said plurality of grey level areas are adjusted by the adjustment unit and before the frame image data is displayed, the adjusted grey level values included in each said grey level area using a preset scale and round the decreased values.

18. The image processing apparatus according to claim 7, wherein said adjustment unit is further configured to keep said grey level values in said each grey level area unchanged when it is determined through the comparison by said comparison unit that said first ratio is equal to said second ratio.

19. A display apparatus comprising the image processing apparatus according to claim 7.

* * * * *